United States Patent
Folling

[15] 3,652,126
[45] Mar. 28, 1972

[54] PNEUMATIC ADJUSTMENT SYSTEM FOR SEAT BACK PANEL

[72] Inventor: Norman D. Folling, Litchfield, Conn.
[73] Assignee: Universal Oil Products Company, Des Plaines, Ill.
[22] Filed: Aug. 31, 1970
[21] Appl. No.: 68,095

[52] U.S. Cl. .............................297/284, 5/348, 297/DIG. 3
[51] Int. Cl. ...........................................................A47c 7/14
[58] Field of Search ..........................297/284, DIG. 3; 5/348

[56] References Cited

UNITED STATES PATENTS

| 2,684,672 | 7/1954 | Summerville | 297/284 |
| 3,042,941 | 7/1962 | Marcus | 5/348 |
| 3,362,032 | 1/1968 | Summers | 5/348 |
| 3,145,054 | 8/1964 | Sopko | 297/284 |
| 3,326,601 | 6/1967 | Vanderbilt et al. | 297/284 |
| 3,363,941 | 1/1968 | Wierwille | 297/284 |

Primary Examiner—Bobby R. Gay
Assistant Examiner—Darrell Marquette
Attorney—James R. Hoatson, Jr. and Philip T. Liggett

[57] ABSTRACT

A pneumatic system for adjusting the thickness or projection of a portion of a seat back, as for example the lumbar section of the back of a seating unit. A self-fillable air reservoir is provided by a foam-filled airtight envelope that will be positioned under the seat portion of the seating unit and this envelope is connected through conduit means and associated valving means to a small volume adjustable bladder portion in the seat back. A special conduit and valving arrangement may also be provided to have the air withdrawn from the seat back bladder portion into the air reservoir envelope so as to deflate the back support portion where there is no seat occupant.

7 Claims, 6 Drawing Figures

PATENTED MAR 28 1972 3,652,126
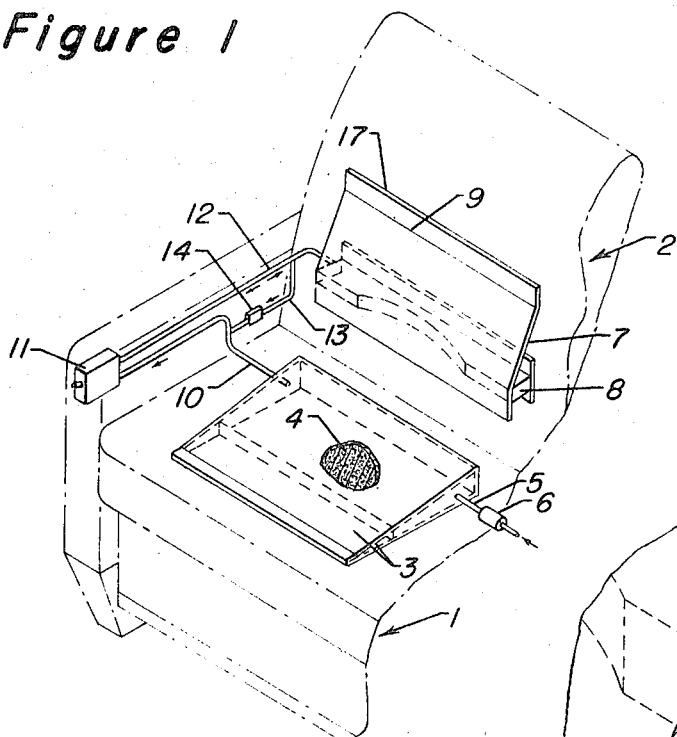
Figure 1
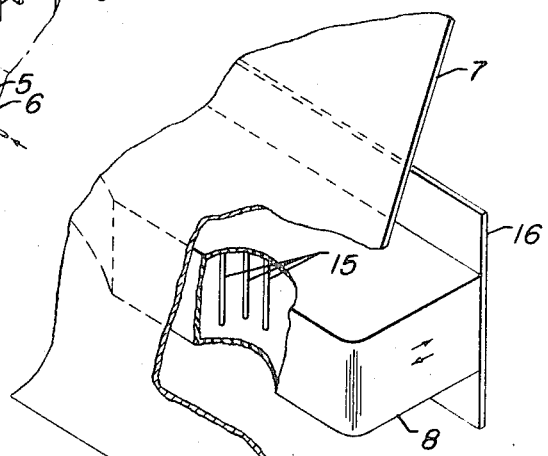
Figure 2
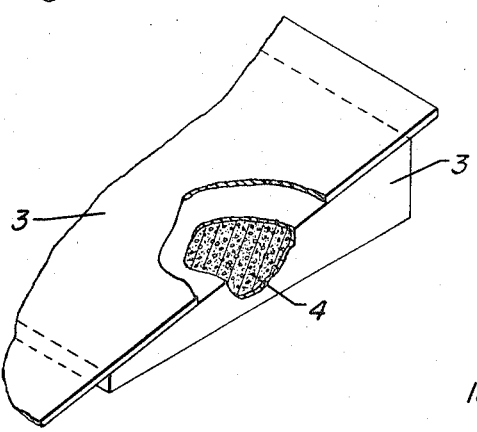
Figure 3
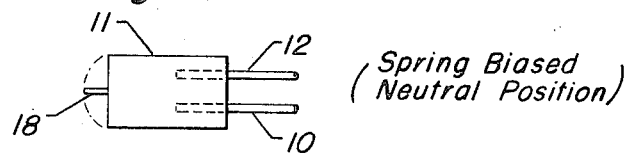
Figure 4a (Spring Biased Neutral Position)
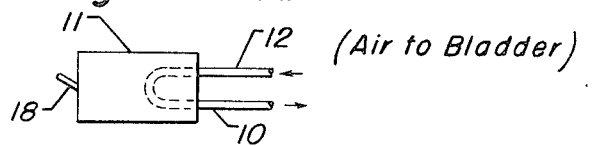
Figure 4b (Air to Bladder)
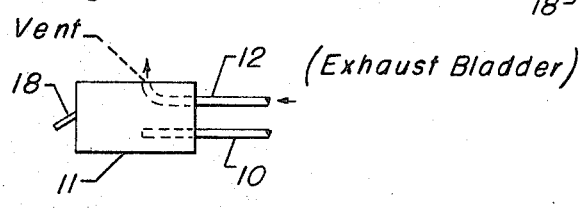
Figure 4c (Exhaust Bladder)
INVENTOR:
Norman D. Folling
BY:
James R. Hoalson Jr.
Philip T. Liggett
ATTORNEYS

PNEUMATIC ADJUSTMENT SYSTEM FOR SEAT BACK PANEL

The present invention relates to a manually controllable pneumatic system for adjusting a portion of a seat back to provide varying degrees of inflation and back support to a seat occupant.

More specifically, there is provided a system for the inflation and deflation of a back supporting section of seating unit by the interconnection of such section with an open-cell foam, self-filling air reservoir section that is adapted to be positioned under the actual seating area of the unit.

Special valving means for the present seating comfort system will provide for air flow from the air reservoir section into a small volume air receiving bladder means that is used to move the particular seat back portion of the unit, and, in addition, will provide for an air exhaust from such bladder means so as to effect a lessening of the back support action.

It is recognized that no one seat shape or contour is ideal for all persons who will be occupying the seat and, as a result, it is of advantage to provide means for adjusting the seat back contour as well as provide for adjustment of the seat back recline position. The adjustment of the entire seat back for all seats in a passenger vehicle, train, airplane, etc. is, of course, not new in that passenger adjustment means have been provided for such types of seats for many years. However, at the present time, the provision for the adjustment of a particular panel section of a vehicle seat, such as a lumbar section in the seat back, has not been customary and only attempted in a very limited number of seating units. Also, present forms of inflatable and adjustable seat back sections have not made use of self-inflating foams, or equivalent means, in combination with manual controllable value means to permit a seat occupant to adjust the degree of body support.

Accordingly, it may be considered a principal object of the present invention to use ambient air to fill an open-cell foam air reservoir section and then provide an interconnection of the latter through special conduit means and valving means to an adjustable, bladder operated back support panel.

It is also an object of the invention to use a special manually operable form of multiple position valve means that effects controlled flows of air to or from the inflatable back support panel section.

Still another object of the present adjustable cushioning system is to provide for the withdrawal of air from the inflatable back support panel into the air reservoir section so as to deflate the back section when there is no seat occupant.

In a broad aspect, the present invention provides a pneumatic form of seat back panel adjustment system for a seating unit, which comprises in combination, an air-tight seat envelope traversing at least a portion of the seat area of the seating unit, an open-cell foam filler for said seat envelope to provide self-inflation and air storage therein, a movable seat back panel section for traversing a portion of the back of said seating unit, an expansible-contractable bladder means having a substantially smaller internal volume than said seat envelope positioned in combination with said movable seat back panel section to thereby provide outward and return movements for such section, a conduit means connecting said bladder means with said seat envelope, a manually operative valving means in said conduit means to permit air flow between said seat envelope and said bladder means, and an air inlet means having check valving means in association therewith connecting to the interior of said seat envelope and to said open-cell foam, whereby air can flow into the latter to replenish air transferred to said bladder means.

In order that the present pneumatic system may make use of ambient air to fill the seat envelope and provide an air reservoir, a preferred embodiment will utilize a resilient, springy form of filler material such as open-cell polyurethane foam or latex foam rubber, whereby there is flexibility and comfort to the seat occupant as well as interconnected internal open-cells which will permit a self-inflation from ambient air as well as air expulsion from weight exerted on the foam filled envelope. Generally, the present foam filled air reservoir section may comprise a particular layer, or portion of a layer, of the seat of the seating unit and, in addition, will be below other conventional foam materials such that the seat occupant is unaware of the closed envelope air reservoir section of the seat.

With respect to the adjustable back panel section, such section will normally make use of a more conventional expansible-contractable bladder member rather than open-cell foam materials. In other words, it is desired that the bladder member provide a relatively large degree of movement with respect to the face of the seat back for a small volume of air and, as a result, it will comprise an envelope or bladder means of a narrow elongated configuration having a controlled expansion that is inward and outward with respect to the face of the seat back. In one embodiment, there may be a hinged or otherwise movable panel section that has a narrow elongated, and transversely positioned, bladder means that is capable of moving the panel section inwardly and outwardly with respect to the face of the seat back. The elongated bladder section may be one continuous section or, alternatively, it may comprise a plurality of side-by-side inflatable-deflatable sections which are interconnected from an air header whereby they provide a unified action in moving the seat back panel section outwardly or permitting its retraction, as may be manually controlled by the seat occupant.

In accordance with the present improved system, the self-inflatable air reservoir section and the adjustable bladder in the seat back panel section will be interconnected by a conduit or tubing and a multiple position valving means, that is manually controlled by the seat occupant, will be positioned in the conduit at some point. In addition, an air-inlet passageway with check valve means therein will be connected to the interior of the seat envelope, and to the resilient open-cell foam material therein, such that when there is no weight or pressure on the seat there can be a vacuum intake of air into the envelope and encased foam from surrounding ambient air. Thus the pneumatic system is always ready to be utilized by a seat occupant for adjusting the seat back contour. As to operation, when a person sits in the seating unit, he will be exerting his body weight upon the air reservoir section such that air from the latter may be pressured through the conduit means and the valving means to the back panel section. Specifically, when the occupant moves the valve means to allow for air flow, or inflation, air will be pressured into the inflatable bladder means provided as part of the movable panel section of the seat back. The occupant will, of course, hold the valve in an open position to permit air flow into the back panel section until such time as the latter is moved to give the desired feel or support to the occupant. After the panel section has been inflated and there is a desire to decrease the degree of inflation, then the occupant may move the manually controllable valve means to a different position whereby a desired amount of air may be exhausted from the bladder means in the back panel section and again effect an adjustment to suit his comfort. Thus, in a preferred embodiment, the valving means will provide at least three positions, namely: (1) a neutral position precluding any air flow; (2) an inflating position, providing for air flow from the seat envelope-reservoir section to the inflatable bladder section at the seat back; and (3) a venting position, where air can be exhausted from the inflatable bladder section to the atmosphere and the degree of projection or support by the back panel section will be lessened.

The preferred embodiment of the pneumatic system will be such as to have a considerably larger volume of air initially retained in the foam-filled air envelope or reservoir section as compared to the maximum volume in the inflatable bladder means behind the movable panel section such that a person occupying the seat unit will be able to effect several adjustments of the back panel section from the cushion reservoir.

The present improved pneumatic system is also of advantage in that a modified construction will provide for a check valve to permit only "back flow" through the conduit means or in a by-pass portion of the conduit. In other words, there is a withdrawal of air from the inflatable bladder section in the seat back by reason of a vacuum action from the resilient foam material in the air reservoir section, and this in turn results in the adjustable panel section of the seat back being deflated or depressed at all times that the seat is unoccupied for any length of time. Subsequently, when a passenger is seated and exerts his body pressure on the seat of the unit, there can be a readjustment of the valving means to permit air flow back into the adjustable back panel section.

The air-tight seat envelope for the air reservoir section may be made of polyvinyl or other "plastic" material which is suitable to hold a low superatmospheric pressure; however, it is not intended to limit the envelope or cushioning to any one type of material. Actually, the outer cover or envelope may comprise a relatively thin layer of closed-cell foam material which will not permit air travel from one cell to another and will serve to hold air within the internal open-cell material. Also, suitable spring means may be used together with open-cell foam, or in lieu of foam, so as to provide a suction action and the intake of air through an air passageway with check valve means to effect the desired air storage in the seating area of the seat unit. However, as hereinbefore set forth, a relatively large area, thin open-cell foam section within an airtight envelope provides a preferred form of self-inflating air reservoir section for the pneumatic system.

Reference to the accompanying drawing and the following description thereof will serve to show one embodiment of the improved pneumatic type of seat back panel adjustment system as well as point out advantages which may be obtained from the use of such form of system.

FIG. 1 of the drawing is a diagrammatic view of the back panel adjustment system which utilizes a self-filling air reservoir section in a seat portion of the unit and the interconnection of the latter with an inflatable bladder section within a seat back panel section.

FIG. 2 of the drawing is a diagrammatic view indicating, partially in section, one form of bladder construction which may be used to effect the in-and-out movement of a seat back panel section.

FIG. 3 of the drawing is a diagrammatic view, partially in section, indicating one form of self-filling air reservoir envelope for use in the seat portion of the pneumatic system.

FIGS. 4(a), (b) and (c) indicate diagrammatically the operation of a multiple position valving means to effect the desired air flows in the present pneumatic system.

Referring now particularly to FIG. 1 of the drawing, there is shown a seating unit having a seating section 1 and a back section 2 each of which is adapted to encase and incorporate portions of the present improved pneumatic back panel adjustment system. Within, or below, at least a portion of the seating section 1, there is provided an air-tight envelope 3 adapted to encase an internal resilient, open-cell foam material 4 whereby there is a resulting relatively large volume air reservoir section capable of being self-filled from ambient air. The envelope 3 is necessarily of an air-tight material and will generally comprise a flexible vinyl material, a thin, closed-cell foam, or a fabric having a plastic or rubber type of lining which is capable of holding low superatmospheric pressures. The present embodiment indicates the envelope and the foam filler 4 to be of a wide, relatively thin wedge form configuration; however, the envelope and filler may be of a uniform thickness and still be capable of providing the desired air reservoir section in the system.

Air inlet conduit 5 with check valve means 6 is provided as an air-inlet passageway into the interior of envelope 3 and into the open-cell foam material 4 such that the latter will never be left for any period of time in an unfilled state. The check valve means 6 may be a flapper type valve or ball-check type of construction such that air flow in passageway 5 is permitted to only flow toward and into the cushioning material 4.

In the present embodiment, the adjustable back panel section 7, which is mounted in the seat back portion 2, will have an elongated and narrow bladder section 8 adapted to move the latter from along a hinge line 9 responsive to the quantity of air being introduced into the inflatable-deflatable bladder section 8. It is contemplated that the movable panel section 7 as well as the actuating bladder 8 will be positioned below the finish fabric or other cover material for the outer face of the seat back section 2, or perhaps even spaced below a layer of foam or other cushioning material over the seat back section.

Further, in accordance with the present invention, the interior of the envelope section 3 will connect with the interior of the inflatable bladder section 8 by means of a conduit 10, valve 11, and conduit 12. Thus, air can be caused to flow by virtue of pressure on the envelope 3 and foam material 4 through conduit means 10, valve 11 and conduit 12 into the interior of bladder 8 to effect the inflation of the latter and the outward movement of panel section 7. The valving means 11 will be held open until the bladder 8 is filled and adjusted to a desired comfort level, at which time it will be permitted to be closed and bladder 8 will maintain a fixed inflation. Conversely, the operation of valve 11 to a different position, or by the use of a separate valving means, there may be the venting or exhaust of air from the tubing means 12 and from the bladder 8 to the atmosphere such that the latter is permitted to deflate to a lower and different comfort level. Inasmuch as the valving means for the system will require: (1) a neutral or "off" position for precluding air flow in either direction from the bladder section, (2) means for an air flow into the bladder section 8 and (3) means for the exhaust of air from the latter, the preferred arrangement will have a single multiple position valve unit 11 to effect each of the three positions. This design and construction will be set forth more clearly and in more detail hereinafter in connection with FIGS. 4(a), (b) and (c).

A preferred operation of the present pneumatic system also incorporates an additional passageway or by-pass tube means with a one-way valve, such as may be provided through the use of a by-pass conduit means 13 and check valve means 14 which connects between tube means 12 and tube means 10. In other words, after the pneumatic system has been used by a seat occupant, with his weight on envelope section 3 providing at least partial inflation of bladder means 8 in the adjustable seat back section, there may be a removal of air from the bladder section 8 upon the occupant leaving the seating unit. Actually, the deflation of the back bladder section 8 and lowering of panel section 7 will occur at each time a seat occupant removes his weight from seat reservoir or envelope 3 so that the vacuum action of the foam material 4 will provide suction by way of lines or tubes, 10, 13 and 12 to deflate the air in bladder means 8. The valve means 14 will, of course, be of a one-way check valve type of design permitting air flow only from bladder 8 into the open-cell foam 4 of the reservoir-envelope section 3.

As best shown by FIG. 2 of the drawing, there is indicated one form of construction for bladder member 8 such that the inflation and deflation or expansion and contraction will be only with respect to the front surface of the seat back section 2. In other words, the bladder section 8 will be of an airtight flexible material such as of air-tight vinyls, lined fabrics, etc., with the upper and lower surfaces being tied together by suitable strings or webbing 15 whereby up and down expansions are substantially precluded. For convenience, there is indicated a backing section 16 suitable for mounting the bladder section 8 within the interior of a portion of the seat back section 2. The back panel section 7 may be positioned or attached below the surface of the seat back to an upper tab section 17, as best shown in FIG. 1, or otherwise movably held in place above bladder member 8. Panel section 7 may be of different configurations and of different stiffnesses, but in any case shall be capable of working with the bladder section 8 so as to provide a controlled in and out movement responsive to varying degrees of inflation for the bladder member 8. It may be further noted with reference to FIGS. 1 and 2 that the bladder 8 has a concave central portion to be in contact with the outer panel 7 and permit the latter to be, in turn, inwardly curved or depressed to cradle or fit the seat occupant's back section. In any case, it is not intended to limit the present invention to any one shape or configuration for the inflatable bladder section 8 as long as the latter will have a relatively small internal volume and the ability to move inwardly and outwardly over a transverse portion of the seat back section 2. Generally, to provide a desired seat comfort range, movement will be 2 or 3 inches or more. Also, it is not intended to limit the panel section 7 to any particular type of material or only to a hinged operation with respect to movement outwardly from the seat back section 2. Actually, a portion of the seat back covering or cushioning layer may be utilized in lieu of a separate panel section 7 and be movably adjustable, inwardly and outwardly responsive to the in and out movement of the bladder section 8.

In FIG. 3 of the drawing, there is merely an enlargement of the construction indicated in FIG. 1 in that an envelope section 3, which is of an air-tight construction, will encase an open-cell material 4 within the interior thereof. Also, as better indicated in FIG. 1, the envelope in the filler material will generally transverse a major portion of the seating area such that it may have a suitable air volume to fill the bladder means 8 for several adjustments by any one seat occupant. A large extended area for the seat envelope and air reservoir section will also insure adequate volume and air storage without having undue thickness changes which will be noticeable or uncomfortable to an occupant of the seat.

Referring now particularly to FIGS. 4(a), (b) and (c), there is indicated schematically the different valve positions of a multiple position valve which is preferably utilized to effect the operation of the present improved pneumatic system to control the degree of inflation for the adjustable back panel section. Specifically, there is indicated in FIG. 4(a) a neutral or "off" position where there is no air flow between tubings 10 and 12 and the retention of a given inflation or deflation for the bladder section 8 in the adjustable panel section of the seat back 2. Preferably the valving unit, indicated as 11, will have a spring biased button or lever means 18 that will serve to hold the internal valving members in a neutral position such that there is no air flow from one outlet to another or from one conduit to another. However, as indicated in FIG. 4(b), upon the manual movement of lever means 18 to an "inflate" position, there will be permitted an air flow through tube 10 into conduit or tube means 12 such that there is air flow into the bladder means 8. The seat occupant will, of course, hold the button or lever means 18 such that air flow occurs until a desired comfort level for the bladder means 8 and the back panel section 7 is achieved, at which time the occupant will permit the valve member, by spring biasing, to return to the neutral position and preclude any further air flow. In the event that a seat occupant finds that there is a greater inflation to the bladder means 8 that he desires at his back, then he can adjust the lever means 18 on valve 11 to a third position, as indicated in FIG. 4(c), whereupon there will be a venting of air within valve 11 from tube means 12 and from the interior of bladder means 8. Again, when the seat occupant senses the desired level of inflation and back support from bladder means 8, the valve operating member 18 is permitted to return to the neutral position to preclude any further air flow from the system.

It will be obvious that a plurality of valving means can be utilized to effect the air flow operations indicated by FIGS. 4(a) through 4(c); however, a preferred embodiment will use a single multiple position valve unit to effect the three different positions and regulate flow within or from the system. In addition, it may be noted that the multiple position valving housing, as indicated by 11, could easily be provided with an internal by-pass channel to connect between tubes 10 and 12 and an internal check valve placed in such by-pass channel to be equivalent to check valve means 14. In other words, there is provided in the valving means 11 a by-pass to connect between conduit means 10 and 12 and a valve to thus eliminate conduit 13 and valve 14 for withdrawing air from bladder means 8 into the air reservoir section in envelope 3.

Through the use of the by-pass arrangement and a one-way valve therein, there is the automatic deflation of the back bladder means 8 and panel section 7 at each time that a seat occupant leaves the seat for any prolonged period of time. This feature thus provides that the system will always have the adjustable back panel section eventually return to the deflated position when the seating unit is unoccupied. The rate of deflation will be controlled by the orifice size provided within the check valve means 14 and such orifice size should be correlated with that used in check valve 6 so that all air flow is not through the latter into envelope 3 when weight is removed from the seating portion. In any event, it will be noted that the present pneumatic system differs from prior lumbar seat support units, or other adjustable panel sections, in that the adjustable panel section is returned to the deflated position as compared with lumbar units or adjustable panel sections that use a resilient open-cell material which will take in air and become inflated at such times as there is no seat occupant.

As hereinbefore set forth, it shall be recognized that the configurations and constructions indicated in the present drawing are merely diagrammatic and that other shapes, types of interconnection, and general positioning within a seat unit can vary in accordance with a particular seat usage or with a type of upholstery and cushioning to be used in connection with the manufacture of the seating unit.

I claim as my invention:

1. A pneumatic form of seat back panel adjustment system for a seating unit, which comprises in combination, an air-tight seat envelope traversing at least a portion of the seat area of the seating unit, an open-cell foam filler having internal springiness and resilience for said seat envelope to provide self-inflation and air storage therein, a movable seat back panel section for traversing a portion of the back of said seating unit, an expansible-contractable bladder means having a substantially smaller internal volume than said seat envelope positioned in combination with said movable seat back panel section to thereby provide outward and return movements for such section, a conduit means connecting said bladder means with said seat envelope, manually operative valving means in said conduit means to permit air flow between said seat envelope and said bladder means, and an air inlet means having check valving means in association therewith connecting to the interior of said seat envelope and to said open-cell foam, whereby ambient air will flow into the latter when there is no occupant weight thereon to replenish air transferred to said bladder means.

2. The seat back panel adjustment system of claim 1 further characterized in that said manually operative valving means provides by one adjustment thereof an air flow through said conduit means from the open-cell foam in said envelope to said bladder and provides, in another adjustment thereof, an air venting flow from said bladder means to the atmosphere.

3. The seat back panel adjustment system of claim 1 further characterized in that a by-pass passageway is provided around said manually operative valving means and between said conduit means and a check valve means is provided in such passageway to permit only air flow from the bladder means to said open-cell foam in said seat envelope.

4. The seat back panel adjustment system of claim 1 further characterized in that said bladder means comprises a narrow elongated configuration and is primarily only expansible inwardly and outwardly with respect to the front face of the back of the seating unit.

5. The seat back panel adjustment system of claim 1 further characterized in that said seat envelope with open-cell foam therein is of a wide and thin configuration adapted to be positioned under at least a portion of the conventional seat cushioning of said seating unit.

6. The seat back panel adjustment system of claim 1 further characterized in that said manually operated valving means comprises a single multiple position valve unit which has an operative lever means that is spring biased to preclude air flow in the conduit means, a second position to provide air flow from the seat envelope to said bladder means and an additional position to permit air venting from the conduit means connecting to said bladder means whereby the latter is permitted to deflate.

7. The seat back panel adjustment system of claim 1 further characterized in that additional passageway means is provided connective to said conduit means that by-passes said manually operative valving means and a one-way check valve is provided in said additional passageway means permitting only unidirectional air flow to said air-tight seat envelope from said bladder means, whereby the latter may be deflated responsive to a vacuum that can be provided by the open-cell foam filler in said seat envelope.

* * * * *